US006644617B2

(12) United States Patent
Pitlor

(10) Patent No.: US 6,644,617 B2
(45) Date of Patent: Nov. 11, 2003

(54) REMOTELY ATTACHABLE AND SEPARABLE COUPLING

(76) Inventor: Nelson Douglas Pitlor, 9796 Ravenswood Dr., Twinsburg, OH (US) 44087

( * ) Notice: Subject to any disclaimer, the term of this patent is extended or adjusted under 35 U.S.C. 154(b) by 164 days.

(21) Appl. No.: 09/730,920

(22) Filed: Dec. 6, 2000

(65) Prior Publication Data

US 2002/0066845 A1 Jun. 6, 2002

(51) Int. Cl.⁷ .............................................. F16M 13/00
(52) U.S. Cl. ..................................... 248/544; 294/19.1
(58) Field of Search ........................ 248/206.5, 309.4, 248/205.4, 683, 342, 544; 340/628; 361/600, 679, 807, 809, 825; 294/19.1

(56) References Cited

U.S. PATENT DOCUMENTS

| | | | |
|---|---|---|---|
| 4,058,357 A | 11/1977 | Wallace ..................... 339/12 R |
| 4,074,341 A | 2/1978 | Niederost et al. | |
| 4,422,137 A | 12/1983 | Watts ......................... 362/390 |
| 4,538,214 A | 8/1985 | Fisher et al. ................ 362/147 |
| 4,719,549 A | 1/1988 | Apel ........................... 362/398 |
| 4,911,396 A | * | 3/1990 | Polonsky .................... 248/547 |
| 4,982,581 A | 1/1991 | Furuyama | |
| 5,149,038 A | 9/1992 | VanCleve ................ 248/247.2 |
| 5,154,509 A | 10/1992 | Wulfman et al. ........... 362/226 |
| 5,178,453 A | * | 1/1993 | Runels ........................ 362/398 |
| D345,028 S | 3/1994 | Alvarez Baranga .......... D26/99 |
| 5,382,167 A | 1/1995 | Janson, Jr. ..................... 439/38 |
| 5,401,175 A | 3/1995 | Guimond et al. ............. 439/38 |
| 5,457,614 A | 10/1995 | Duty .......................... 362/220 |
| 5,457,619 A | 10/1995 | Ewing ........................ 362/398 |
| 5,472,163 A | 12/1995 | Callas ...................... 248/206.5 |
| 5,478,256 A | * | 12/1995 | Koganemaru ............... 439/507 |
| D369,781 S | 5/1996 | Schadhauser ............. D13/134 |
| 5,563,766 A | 10/1996 | Long et al. | |
| 5,577,696 A | 11/1996 | Kramer | |
| 5,609,317 A | 3/1997 | Glynn et al. .............. 248/206.5 |
| 5,617,079 A | * | 4/1997 | Harrison ...................... 340/693 |
| 5,708,874 A | 1/1998 | Schrock et al. ............. 396/174 |
| 5,782,445 A | 7/1998 | Cleek ....................... 248/206.5 |
| 5,793,295 A | 8/1998 | Goldstein .................... 340/632 |
| 5,803,751 A | 9/1998 | Liu .............................. 439/39 |
| 5,967,640 A | 10/1999 | Moriyama et al. .......... 362/147 |
| 6,042,080 A | 3/2000 | Shepherd et al. ........... 248/683 |
| 6,095,660 A | 8/2000 | Moriyama et al. .......... 362/147 |

OTHER PUBLICATIONS

System Sensor, "XR–5 Detector Installation/Removal Tool For Use With System Sensor Plug–In Detectors", pp. 1–2, date unknown.

Hochiki America Corporation, "NSRT–A100 / NSTT–A100 Smoke Detector Removal Tool / Tester", 2 pages, date unknown.

* cited by examiner

Primary Examiner—Gwendolyn Baxter
(74) Attorney, Agent, or Firm—Renner, Otto, Boisselle & Sklar, LLP

(57) ABSTRACT

An article to be mounted from or against the ceiling is removably coupled to a secured base fixedly secured to the ceiling, by a person standing on the floor of the room, supporting the article on the end of an elongated rod, and thrusting the article against the secured base with sufficient force to couple the article and the secured base. The article is removed from the secured base by inserting an end of the rod into the article, exerting a force on the rod to uncouple the article from the secured base, and supporting the article on the end of the rod as the article is lowered. The article is thus positioned on the ceiling, or hung from it, without being manually contacted by the person. The article may be a mounting member provided with fasteners such as hooks from which overhead signs may be hung and quickly interchanged without using a stepladder; of the article may be a smoke detector and alarm assembly which is directly mounted to the secured base.

25 Claims, 8 Drawing Sheets

REMOTELY ATTACHABLE AND SEPARABLE COUPLING

FIELD OF THE INVENTION

The present invention relates to an improvement in access means for an assembly located on a room's ceiling or other overhead location, by a human manipulating the assembly while standing on the room's floor; seated in a wheelchair, or otherwise unable to reach the assembly unassisted. The primary purpose of the assembly is to suspend an article, such as a sign, or, pendently support a device, such as a smoke detector and alarm or other electrically actuated fixture, which, of necessity, is to be secured to the ceiling, and periodically removed for renewal, maintenance or inspection.

BACKGROUND OF THE INVENTION

Magnetic holders such as are disclosed in U.S. Pat. No. 5,472,163 to Callas are used to display signs on upright metal supports. A permanent magnet is wedged between a pair of metal plates and enclosed within a shell shaped to provide horizontal stability and a strong holding force on the support. An upright cylindrical adaptor attached to the top of the shell is used to accommodate the shaft of the sign.

The problem to be solved herein is different from that addressed in the '163 patent. This invention is directed to a problem that is encountered when dealing with an article suspended, or to be suspended from a ceiling, or other overhead location, in typical everyday situations. The problem: how does a person locate and manually secure an article on a high, out-of-reach ceiling or other overhead location without using something to stand on, for example, a stepladder. Thereafter, how does the person remove the article when required to do so, again without resorting to climbing onto a surface higher than the floor, since the overhead location is well out of reach of the person's upwardly outstretched hand, as the ceiling usually is? Such a ceiling, referred to herein as a "high" ceiling may be in the range from about 8 feet (2.44 meters) to about 30 feet (9.14 m) high.

The novel assembly disclosed herein comprises two separate parts, one of which, a first part, is secured to the ceiling, wall, or other overhead location, usually out of reach location; the other, second part, may be secured to the article, or, may be the article itself, adapted to be releasably coupled internally with the first part, that is, coupled with coupling means within the body of the first part. Components of the assembly are adapted to removably secure an article to the high location with a manually manipulated elongated tool or rod, referred to herein as a "rod" for brevity, thus avoiding using a step-ladder, the effort of hauling the step-ladder underneath the assembly, and the risk of injury posed by having to deal with the assembly on the high location while standing on the step-ladder.

Merchandise such as toys, garments, groceries, hardware, lumber, and office supplies, is commonly advertised within a store by signs hanging from the store's ceiling. Such signs may serve to direct a customer to a particular product, for example, bread in a grocery store; or the sign may serve to advertise a "special" on a particular item. Because the locations of goods in a store is frequently changed, as is the "special" offered from week to week, the location of the signs, as well as the signs themselves, must also be correspondingly changed. This is typically a time-consuming effort usually carried out after a store is closed for the day, and requires that an employee drag a step-ladder from one sign to the next one which is to be changed, or to use a motorized scissor-jack to travel from one to the other and change it. With the advent of stores which are open round the clock (the "24 hr. store") signs must be changed during a time when there are the fewest customers on the premises, if only to avoid risk of injury to them.

In numerous celebratory situations, congratulatory signs, streamers and balloons are hung from the ceiling, usually tied to a pendent fixture such as a hanging light or ceiling fan. Restaurants and hotels have "party rooms" dedicated to celebrations, and such a room's ceiling is sometimes provided with hooks, the same color as the ceiling, which are unobtrusively screwed into the ceiling. The hooks are used to suspend balloons and streamers, which are required to be changed for each occasion, entailing a substantial amount of time-consuming labor. The simple task of inserting a hook into the eye of an eye-bolt on the ceiling, or snagging a hook on the ceiling with another hook from which a bunch of balloons is hung, while standing on a step-ladder is a trying and time-consuming task. It would be far less expensive and more efficient to be able to change the pendent decorations without having to mount a stepladder for each decoration to be changed.

Another article suspended from a ceiling, which is required to be reached relatively frequently, is a battery-operated smoke detector and alarm ("smoke alarm"), the battery for which must be changed when its charge is depleted. As anyone who has replaced batteries in a smoke alarm secured to the ceiling is well aware, enthusiasm for changing the battery, immediately upon noting that it must be changed, is inhibited, and the task is complicated, by having to climb onto a step-ladder while removing and replacing the battery with outstretched arms. Typically, the battery is to be inserted in a tightly-fitting harness in the body of the smoke alarm. To ease the task, and allow a person to change the battery with less stress on his arms, U.S. Pat. No. 5,577,696 to Kramer discloses a steel base plate which is fastened to the ceiling; a magnet is held in a receiver secured to the smoke alarm, so that when the magnet is placed on the steel base plate, the smoke alarm is held on the ceiling. When the battery is to be changed, the magnetic coupling allows one to remove the smoke alarm from the base plate, but one has to stand on a stepladder to do so. The difficulty of registering a steel plate to a magnet secured to the ceiling is minimal so long as the task is addressed by a person on a stepladder and the magnet is conveniently within the person's arm's reach. The difficulty of the simple task is greatly exaggerated if the steel plate is to be registered to the magnet on a ceiling which cannot be reached with a conveniently available stepladder, the higher the ceiling, the more daunting the task, and certainly impossible if the person is in a wheelchair. It is only retrospectively self-evident that it is far more convenient and much safer, to remove the smoke alarm without having to use the stepladder, if only the solution to the problem was readily at hand.

More specifically the two parts of the novel assembly may comprise subassemblies only one of which is removable from the ceiling by being manually couplable and decouplable while standing on the floor of the room, using a broom stick or other elongated rod, easily manipulated with purposeful accuracy and little force, by that person.

SUMMARY OF THE INVENTION

An assembly adapted to be secured to a ceiling or other overhead location comprises a pair of first and second subassemblies couplable and decouplable by a person standing on the floor, without manually directly contacting either, but using a rod or other elongated member. The first subassembly is preferably fixedly secured to the ceiling or other overhead location, hence referred to as the secured subassembly, or "base member" or "base" for brevity; the second subassembly, which provides a surface to which an article is secured, for example a hook or an electrical fixture, is removably coupled to the base; because the second subassembly is used to mount the article which is to be suspended, or, is itself provided by the base of the article to be suspended, the second assembly is referred to as the suspended subassembly, or "mounting member" or "mount" for brevity. The two subassemblies, namely, the base and mount, are coupled to one another with remotely uncouplable coupling means, for example, magnetically, or, with mating hooks and eyelets such as are provided with Velcro® fasteners adhesively secured within the base and mount respectively, or, by a detent means integrally formed with the base and mount, such as a peripheral detent, or, a latching means, or, an interference fit. A rod-acceptance means, such as a socket, or finger-like protrusion, or through-passage in the mount, also functions as a detachment means, depending upon whether the mount is to be positioned on the base, or removed from it; when the rod-acceptance means is a rod-attachment means, it is secured to the mount, preferably integrally formed therewith, and is adapted to be interfitted to one end of a rod so as to be securely supported by it. When a force is exerted on the rod by a person manipulating it from the floor of the room, the mount is easily engaged with, or disengaged from the base, the mechanical advantage arising from the use of a long rod as a lever. Preferably, the dimensions of the mount are so chosen that it be mated to the base with effortless accuracy; a decoupling force adequate to disengage the mount from the base is exerted on the end of the rod to remove the mount after it is mated. The decoupling force required to decouple the subassemblies depends upon the coupling force exerted by the coupling means, and the decoupling force exerted is increased by the length of the rod which provides the leverage.

In a first specific embodiment, the base and mount are magnetically couplable, then decoupled when required, by a person on the floor of a room.

In a second specific embodiment, the base and mount are couplable with mating hooks and eyelets such as are provided with Velcro® fasteners.

In a third specific embodiment, the base and mount are couplable with interfitting detent means.

In a fourth specific embodiment, the base and mount are couplable with a latching means.

In a fifth specific embodiment, an assembly secured in position as exemplified in one of the foregoing four specific embodiments is provided with at least two electrical contacts in electrical connection with wires in the ceiling; an electrical fixture secured to the mount is electrically connected to the wires in the ceiling when the subassemblies are coupled; and when they are decoupled, the electrical connection is broken.

In a sixth embodiment, the component-mounting floor of a smoke detector and alarm assembly, or light fixture, by itself, is coupled with magnetic coupling means, directly to a base member secured to the ceiling; electrical components which actuate the detector and alarm, or light fixture, and a replaceable battery are mounted on the component-mounting floor of the detector and alarm which is covered with a removable cover; rod-attachment means are provided integrally with the cover.

BRIEF DESCRIPTION OF THE DRAWING

The foregoing and additional objects and advantages of the invention will best be understood by reference to the following detailed description, accompanied with schematic illustrations of several embodiments of the invention, in which illustrations like reference numerals refer to like elements, and in which.

DETAILED DESCRIPTION OF PREFERRED EMBODIMENTS

Figure 1:
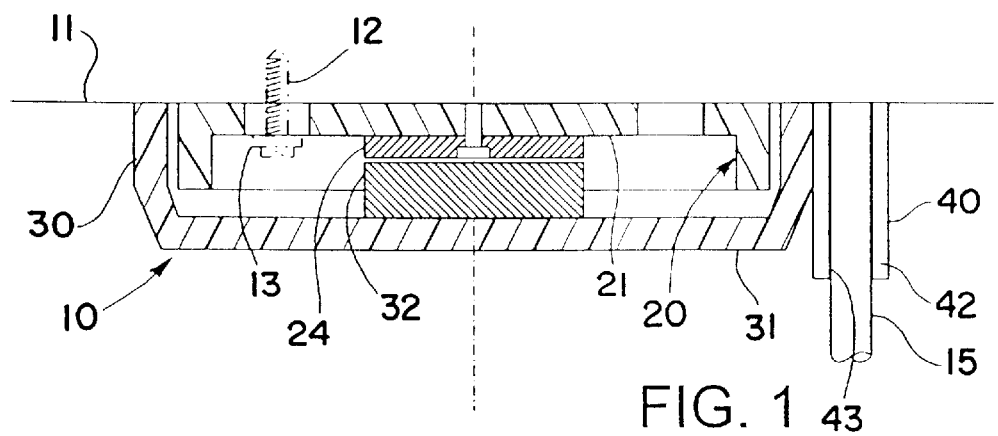
FIG. 1 is a cross-sectional side elevation view of assembled first (base) and second (mount) subassemblies, the base being secured to a ceiling, and the mount magnetically held against the base which is received within the mount.

In the past, an article heavier than about 0.45 kg (1 lb) was not removably suspended with manually decouplable coupling means because of the relatively high manual force (greater than 1 lb) required to disengage the article. Such force had to be applied while standing on a step-ladder or other elevating means which permitted a person to reach the article. The higher the force required, the greater the risk of falling off the step-ladder. In an embodiment of this invention, a relatively small force, easily applied on the rod with one hand, will angulate the centerline of the suspended subassembly relative to the first (fixed base) sufficiently to allow the suspended subassembly to be angularly disengaged, even if the magnet means, Velcro® fasteners or other coupling means exerted a force of about 10 kg (22 lb). Though articles heavier than about 1 kg (2.2 lb) are easily and safely suspended with the suspended subassembly of this invention, much heavier articles, heavier than about 10 kg (22 lb) are not suited to be suspended by a single suspended subassembly as the danger of losing control of fitting and removing the suspended subassembly on the end of a rod presents a risk of injury to a person who loses control. When such heavier objects are required to be suspended with a single assembly, it preferably comprises plural coupling means appropriately located between the base and the mount; each of the coupling means preferably exerts e.g. a magnet or Velcro® fasteners exerting a force in the range from about 0.45 kg (1 lb) to about 4.5 kg (10 lb) force. Particularly where objects heavier than about 1 kg (2.2 lb) are suspended with a magnet, the cost of the magnet and the ferrous plate are the major portion of the cost of the assembly; therefore it is desirable to use the magnet most efficiently, that is, utilize all its strength.

To register the couplable components, e.g. the magnet means with its ferrous metal counterpart, irrespective of which couplable component is secured to the base or the mount, or pair of magnets, the suspended subassembly is advanced upward to the secured subassembly so as to permit coupling them. It is most preferred that the couplable components be at least one magnet and a ferrous metal; and that they be registered with mating dish-shaped members one of which houses the magnet(s), the other housing the ferrous metal. It is most preferred that the rod-acceptance means be a rod-attachment means such as a socket or finger-like protrusion, rather than a through-passage in the mount, for reasons set forth herebelow. The end of the rod supports and balances the mount as it is raised to the base. When the rod-attachment means is a socket, preferably integrally formed with the mount, the end of the rod which is biased against the closed end of the socket by gravity, or threadedly engaged therein. After the mount is coupled to the base, the end of the rod is removed from the mount. The mount may be serviced by inserting the end of the rod into the rod-acceptance means, exerting sufficient force to decouple the mount from the base, supporting the mount on the end of the rod and lowering the mount to allow it to be removed from the end of the rod.

The secured first subassembly or "base member" is preferably of a standard, preferably circular configuration, providing a dish-shaped base; the suspended second subassembly or "mount" may be of any arbitrary configuration, and each differently configured mount is preferably interchangeably couplable to the base member; for example, a configuration of the suspended subassembly may include a box-shaped mount, the mount having an overall rectangular shape and planar floor; a hook is secured to hang from the lower surface of the floor; two or more spaced-apart hooks may be provided to support a sign which is required to be hung from plural hooks; another mount may include a cup-shaped configuration and a planar, circular lower surface which may be used to mount a smoke alarm. In each case the base member preferably includes a peripheral downward-extending wall and the mount typically provides a generally planar base, or a dish- or cup-shaped member having a generally planar floor with an outwardly flaring peripheral wall to allow the peripheral wall of the dish-shaped base member to be received when the mount is couple to the base member.

It is critical that the base member and mount be couplable and decouplable without manually touching either, though which subassembly holds the magnet, as long as one is fixed, is not critical. By "without manually touching" is meant that there is no contact of the subassemblies with a person's hand during installation or removal of the mount. It is preferred that magnet coupling means be held in mating dish-shaped base and mount members so as to facilitate aligning the magnet and the ferrous metal. It is preferred that the peripheral walls of the subassemblies be dimensioned such that the entire surface of the one or more magnets used is covered by the ferrous plate to make economic use of the full strength of the magnet.

Figure 2:
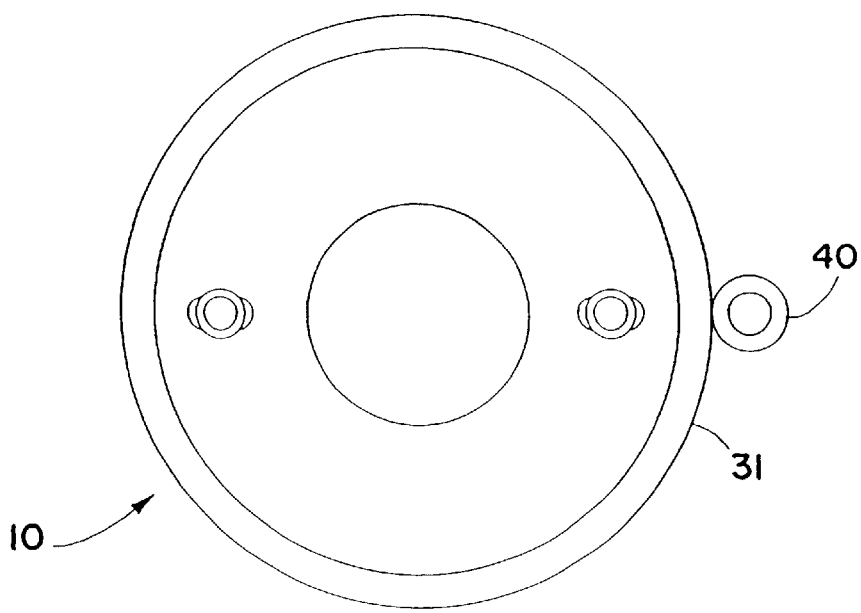
FIG. 2 is a bottom plan view, that is, viewed from beneath, of the assembled base and mount shown in FIG. 1.

It will be recognized that some residential ceilings may be no more than 2.44 meters (8 feet) from the floor of a room but in numerous instances even residential ceilings may be 9.14 meters (10 feet) or more, and ceilings in commercial salesrooms and warehouses are even higher, typically in the range from 4.57 meters (15 ft) to 9.14 meters (30 ft). The higher the ceiling the more difficult it is to manipulate anything on the ceiling from the floor. Therefore, as is illustrated in FIGS. 1 and 2, first (base member) and second (mount) subassemblies 20 and 30 respectively are matingly disposed against the ceiling 11. Though the shapes of the base member and mount are not necessarily interrelated and may be arbitrary as long as the shapes allow the coupling means to be engaged and disengaged when desired, it is convenient to use a generally circular base and mount for ease of assembly and accurate registration of coupling means.

The base 20 most preferably includes a first synthetic resinous cup-shaped dish 21 ("first dish 21" for brevity) which is secured to the ceiling 11 with suitable fastening means, preferably a pair of oppositely spaced apart screws 12 inserted through washers 13. The mount 30 comprises a second synthetic resinous cup-shaped dish 31 ("second dish 31") which is shown matingly coupled in male-female relationship with the first dish 21. Centrally located in the first dish 21 is a magnet 24 (see FIG. 3) and a plate of ferrous material 32, preferably steel, is located centrally within the second dish 31, corresponding to the magnet 24, so that the surfaces of the magnet and steel plate will be in tight contact when the first and second dishes are mated.

It will be evident that when the coupling means is magnetic, the material from which the second dish 31 and the first dish 21 are formed is non-magnetic, and is most preferably poly(vinyl chloride), styrene or a phenol-formaldehyde resin, though aluminum would be suitable.

The second dish 31 is mated to the first dish 21 by holding the former on the end of a rod 15, so that the magnet 24 is fully covered by plate 32, as shown in FIG. 2. On the end of a long rod, the second dish 31 is more easily slid over the circular periphery of the first dish 21 than if the peripheries of each was other than circular. For example with a rectangular first dish and a correspondingly rectangular second dish, the corners of each must be accurately matched before the two can be mated; elliptical shapes are easier than rectangular but more difficult than circular.

Figure 3:
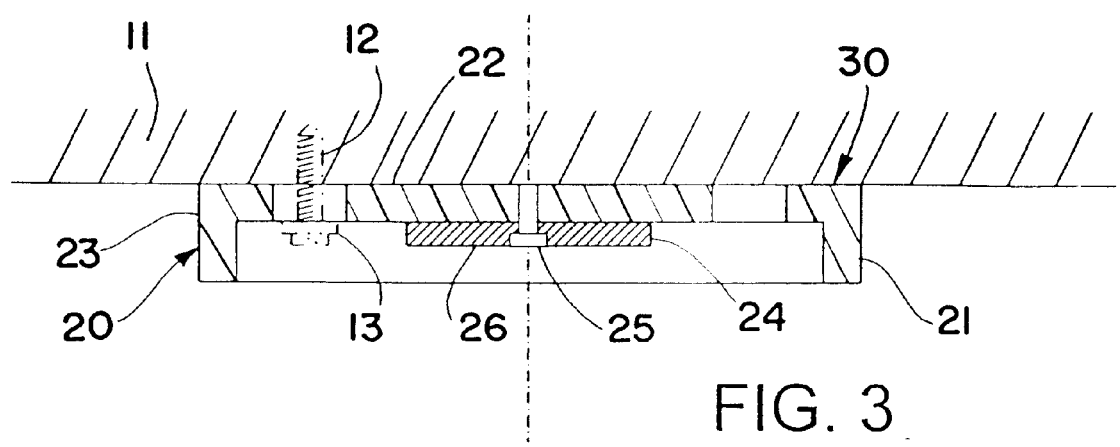
FIG. 3 is a cross-sectional side elevation view of the base secured to the ceiling.
Figure 4:
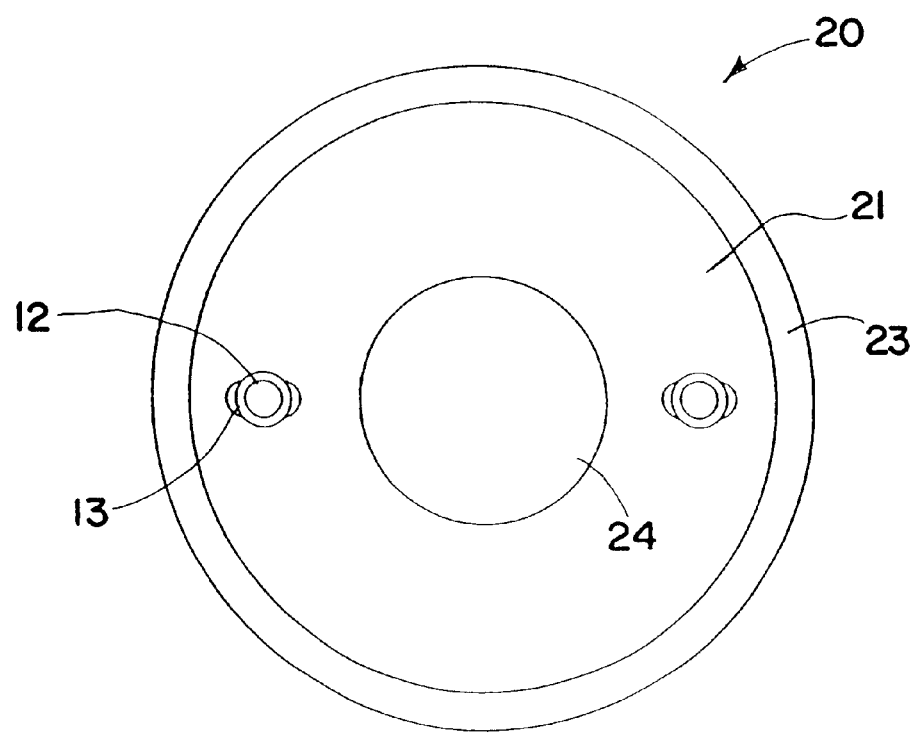
FIG. 4 is a bottom plan view, that is, viewed from beneath, of the base shown in FIGS. 1 and 2.

Referring to FIGS. 3 and 4, it is seen that the first dish 21 of the base 20 includes a planar disc 22 peripherally ringed by an integral cylindrical wall 23. Centrally secured to the lower surface of disc 22 is magnet 24, preferably with a screw 25, the head of which is in a correspondingly shaped hollow countersunk in the lower face of the magnet so that it presents a planar lower surface against lower surface 26. The strength of the magnet 24 is chosen to correspond with the weight of the objects to be suspended, for example, in the range from 113.4 gm (0.25) lb to about 4.536 kg (10 lb). As will readily be apparent, the greater the weight to be suspended, the stronger the magnet required and the greater the force required to disengage a suspended mount which is magnetically coupled with the magnet. It will also be evident that the expense of the magnet will dictate that the assembly be designed to suspend a particular maximum load, and that the magnet's strength be optimally utilized. Such optimal use can only result when the area of the magnet is fully covered by the ferrous counterpart (see FIGS. 1, 2 & 10).

Reverting to FIGS. 1 and 3, to ensure that the magnet 24 is fully covered by the ferrous plate 32, irrespective of where the magnet 24 is positioned on the planar disc 22 of the first dish 21, the area of the latter (plate 32) may be much larger than that of the magnet, and may occupy substantially the entire area of the floor 37 of the second subassembly. Of course such unnecessarily large area of the ferrous plate to compensate for inappropriately positioning the magnet is costly and wasteful; therefore, matching the area of the magnet 24 to an appropriate area of the plate 32 is to be ensured.

Figure 5:
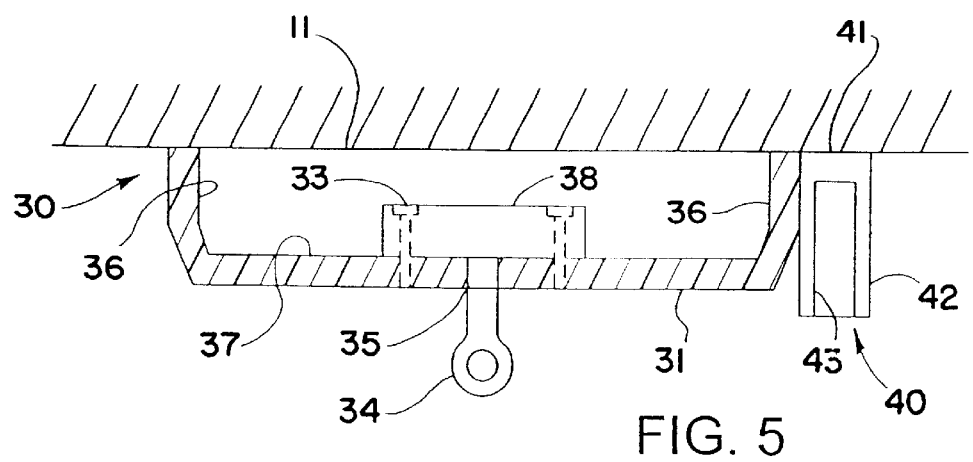
FIG. 5 is a cross-sectional side elevation view of the mount secured to the ceiling (the base is not shown).
Figure 6:
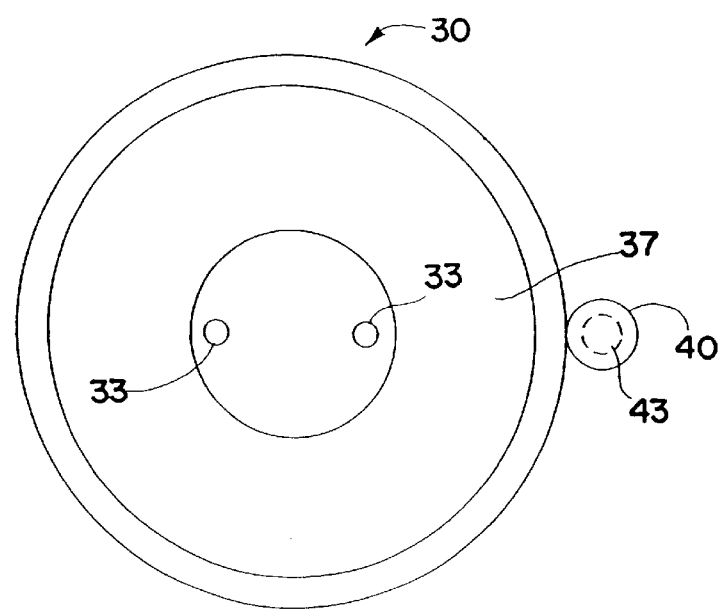
FIG. 6 is a bottom plan view, that is viewed from beneath, of the mount shown in FIG. 5.

Referring to FIGS. 5 and 6, the second subassembly or "mount" 30 includes second dish 31 and a tubular socket 40; the socket 40 preferably has a closed end 41 and downwardly extending sidewalls 42 by which the socket is secured to the exterior periphery of the second dish 31. The socket 40 is secured so that its cavity 43 is directed substantially vertically downward and the closed end's planar base is substantially coplanarly disposed relative to the plane of the peripheral surface of the second dish 31. The cross-section of the cavity 43 is not critical, serving only to slidably accommodate the end of rod 15. Since a cylindrical rod such as a broom handle is typically conveniently at hand, the cavity is cylindrical in cross-section. The closed end of the socket 40 serves to support the mount on the end of the rod; however, if the socket is open-ended, that is, a hollow tubular section, the rod may nevertheless be angulated relative to the vertical, to remove the mount. A relatively close tolerance between rod and the walls of the socket or tube will permit the second subassembly to be lowered controllably.

A ferrous metal disc 38 secured to the floor 37 of the second dish 31 with appropriate fastening means, preferably a pair of opposed spaced apart screws 33 the heads of which are countersunk in the planar surface of the steel disc 38 and threaded into the floor 37. The steel disc 38 is bored and threaded to receive a correspondingly threaded eye-bolt 34, which is inserted through a central aperture 35 in the floor 37, the eye-bolt in turn suspending a sign from a hook (not shown). When the hook is inserted into the eye of the eye-bolt an article, such as a sign, attached to the hood is suspended from the ceiling. Changing the sign is accomplished by removing and lowering the second dish 31 to the floor of the room, substituting the appropriate hook in the eyebolt, inserting a rod 15 into the socket 40 and replacing the second dish 31 on the first dish 21.

The function of the second dish 31 is primarily to provide a mount, but also to permit the first dish 21 to be guided into the second dish 31 so as to center the magnet 24 on the ferrous metal disc 38, and use the entire force exerted by the magnet. To facilitate inserting first dish 21 into second dish 31, the inside diameter of walls 36 of the second dish 31 is greater than the outside diameter of the first dish 21 so the walls 23 of the latter may be readily inserted into the former (second dish 31). To align the ferrous metal disc 38 and the magnet 24 more accurately, a downwardly tapered annular transition zone connecting the walls 36 to the floor 37 urges the periphery of the walls of the first dish 21 inward until, when the periphery of the walls of the first dish 21 abut the floor 37, the magnet 24 is centered upon the steel disc 38. By "downwardly tapered" is meant that the cross-section of the second dish 31 at its periphery is greater than the cross-section of the walls where they meet the floor 37. In practice, the inside diameter of the second dish 31 is preferably in the range from about 5% to about 10% greater than the outside diameter of the periphery of the first dish 21 to allow angulation of the second dish 31 relative to the first dish 21, as is explained below.

The socket 40 most preferably has a smooth-walled interior, its diameter being slightly larger, from about 0.05% to 5%, than that of the rod 15, say a broom handle, to be inserted in the socket. Since the socket is smooth-walled, a directly downward pull on the rod will only serve to remove it from the socket. Therefore, a force is applied at the distal end (from the socket) in the lateral direction. This force serves to pivot the second dish 31 on the base of the socket 40, thus angulating the steel disc 32 relative to the lateral surface of the magnet 24. Such angulation, in the range from about 1° to about 15° is sufficient to break contact with one edge (the distal end from the socket) of the magnet and progressively disengages the remaining surface of the magnet, thus requiring only a fraction, from 50% to 10% or less than the large force required to break contact with the entire surface of the magnet, at one time, substantially instantaneously, which large force would be required if the mount 30 was to be pulled directly downward.

As will now readily be evident, if desired, a large directly downward force could be applied, if desired, by threading the interior wall of the socket cavity 43 and threadedly engaging the end of a rod having a correspondingly threaded end (see FIG. 16), if there is an over-riding reason to do so, since it is apparent that threading the rod into the socket requires additional effort which in most instances is not justified.

The first and second dishes 21 and 31 respectively are most preferably injection molded, and whether the socket 40 has a smooth cavity or is threaded, the socket 40 is preferably integrally molded with the second dish 31. Moreover, where the configuration of the mount permits, the socket may be formed directly in the periphery of the second dish; or, a through-passage in the periphery of the second dish may afford sufficient purchase for the rod, as for example when the second dish supports a larger structure (see FIG. 8).

It will be appreciated that the height of the assembly 10, that is, the distance to which the assembly projects downward from the ceiling, is preferably kept to a minimum to keep the assembly as unobtrusive as possible. Therefore, though the overall dimensions of the assembly are not narrowly critical, for practical applications, the height of the first dish 21 is in the range from about 1 cm to about 4 cm, the height of the corresponding second dish 31 being greater by about the thickness of the floor 37. For most applications, the cross-section of wall 36 and floor 37 is in the range from about 1 mm to about 3 mm, as is the cross-sectional thickness of the first dish 21, the thickness in each case being sufficient to provide adequate rigidity and strength to the assembly, and related to the physical characteristics of the synthetic resin used.

Figure 7:
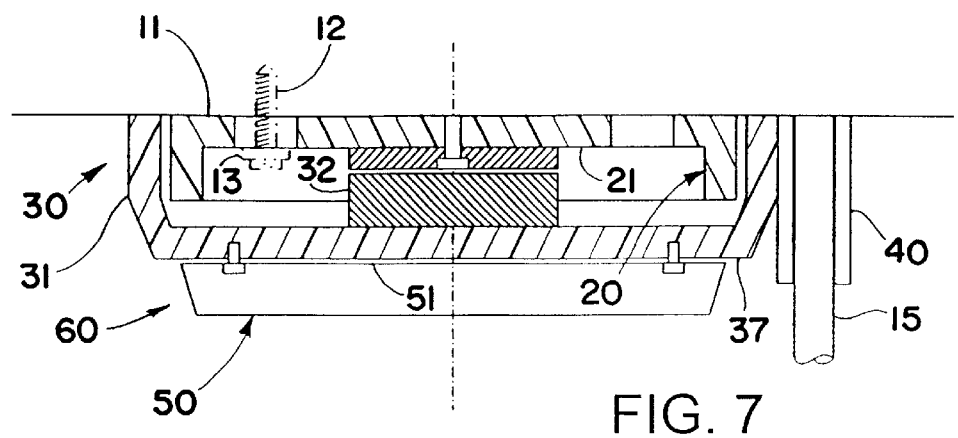
FIG. 7 is a side elevation cross-sectional view of a coupling, including a base to which is magnetically coupled a mount, to the lower surface of which, a smoke detector and alarm assembly ("smoke alarm") is secured.

Referring to FIG. 7 there is schematically illustrated an assembly 60 comprising a base 20, a mount 30, and a conventional smoke alarm 50 secured to the mount 30. Such a smoke alarm typically has a base plate 51 with a bayonet mount to secured it to a receiving base and the receiving base is secured to the ceiling. To suspend such a smoke alarm 50 from the ceiling, using assembly 10, the bayonet mount is dispensed with, and the smoke alarm is directly secured to the lower surface 37 of dish-shaped portion 31 of the mount. As before, mount 30 includes a rod-attachment means, shown as a socket, and a slight force exerted on the end of the rod, in a generally lateral direction, serves to disengage the steel disc 32 from the magnet 24. The smoke alarm 50 may then be conveniently serviced on a table in the room and replaced on the base 21 by reinserting the handle of the broom into the socket 40 and mating the second dish 31 to the first dish 21.

Figure 8:
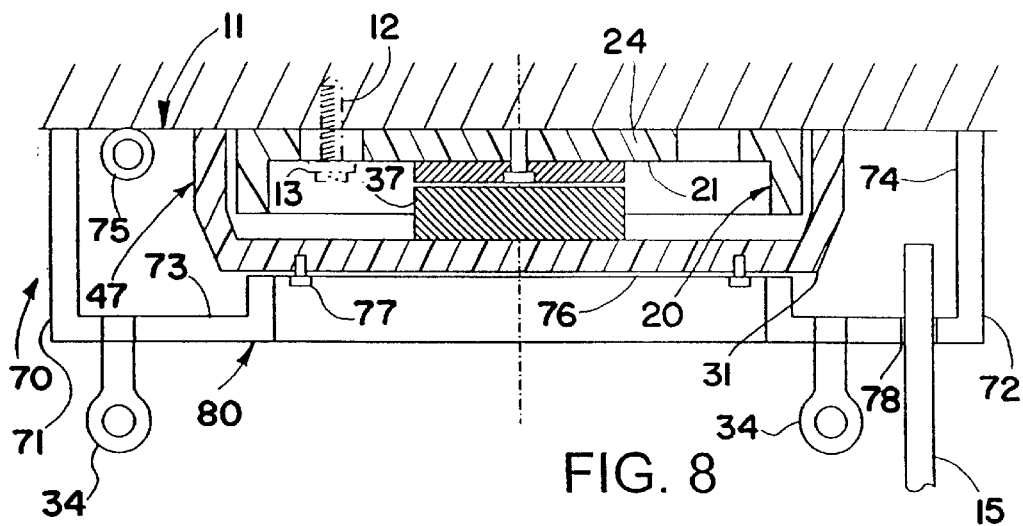
FIG. 8 is a side elevation cross-sectional view of a coupling, including a mount required to have a much larger lower surface than that provided by the mount illustrated in FIG. 5.

Referring to FIG. 8 there is shown an assembly 80 in which the suspended subassembly 70 is the "mount" which includes a cup-shaped member 47 and a suspension member 71 attached to the lower surface of cup-shaped member 47. The suspension member 71 presents a much larger lower surface than that presented by the cup-shaped member 71, the larger surface making it possible to provide plural spaced-apart eye-bolts 34 from which to hang an article (not shown). The shape of the suspension member is arbitrary, the one illustrated being required to clear an adjacent obstruction such as a conduit 75 carried on the ceiling. As shown, the suspension member 71 is a generally rectangular dish 72 having an upwardly stepped floor 73 and vertical walls 74 which abut the ceiling to hide the conduit 75. The central portion 76 of the stepped floor is planar and secured to the lower surface of the second dish 31 with fastening means such as spaced-apart screws 77. A through passage 78 in the suspension member 71 near its periphery is large enough to have a rod 15 inserted in it. As before, a lateral force on the distal end of the rod angulates the steel disc 32 against the magnet 24 and disengages the mount 70.

Figure 9:
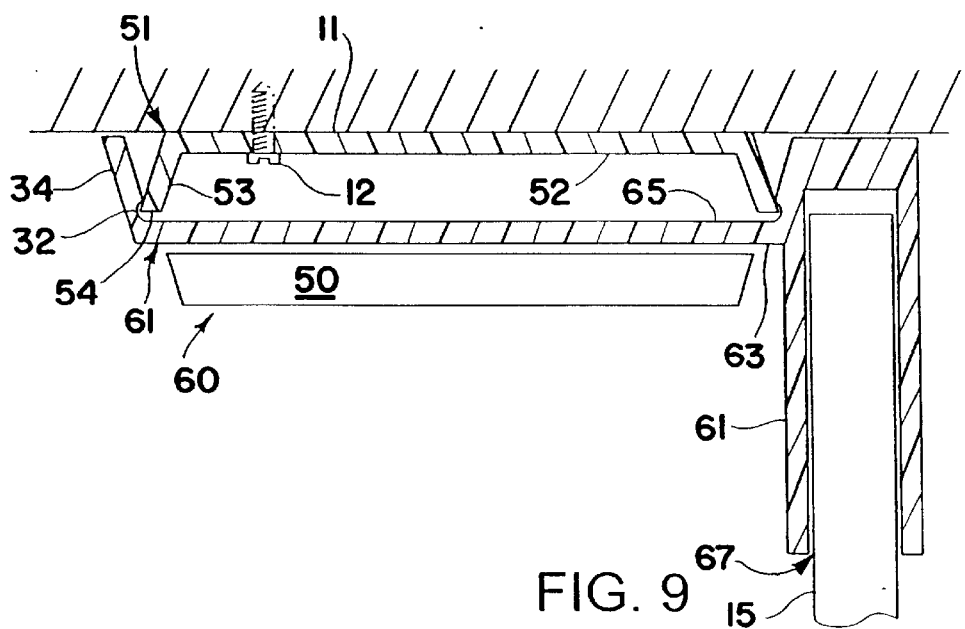
FIG. 9 is a side elevation cross-sectional view of a coupling, including a base the lower peripheral edges of which are interfitted in a circumferential groove providing a detent means by which the base is coupled to the mount, to the lower surface of which, a smoke alarm is secured.

Referring to FIG. 9 there is shown an assembly 60 including a base 51 coupled with a mount 61 with a a detent means, one member of which is preferably integral with the mount and the other member of which is integral with the base. The mount 61 includes a dish-shaped member 63 having an outwardly and upwardly flaring peripheral wall 64 around floor 65. The base 51 has a planar floor 52 attached to ceiling 11 with screws 12 and a peripheral wall 53 which extends downward, flares outwardly from floor 52 and terminates in a rim 54, this rim being the other member of the detent means. The end 54 is engaged in a circumferential groove 62 at the base of the outwardly flaring wall 64, the groove 62 serving as a detent to secure mount 61 to base 51. The groove 62 lies at the apex of the angle formed by the wall 64 and floor 65. Smoke alarm 50 is mounted to the lower surface of the floor 65 with appropriate fastening means such as screws (not shown).

At the periphery of dish-shaped member 63 is provided socket 66 having a bore 67 adapted to slidably accommodate the end of rod 15, as described above. To couple mount 61 to base 51, with the smoke alarm 50 secured to the mount 61, it is supported on the end of rod 15 and wall 53 of the base 51 is guided into the wall 64 of mount 61 until the end 54 snaps into the groove 62. The rod 15 is then removed.

Figure 10:
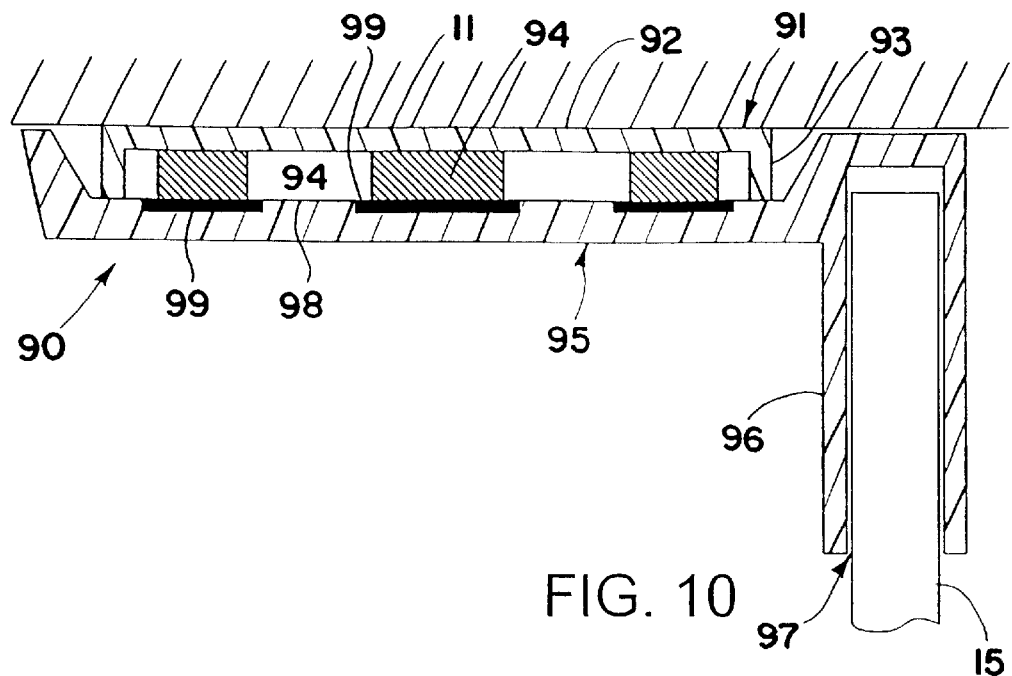
FIG. 10 is a side elevation cross-sectional view of another coupling, including a mount required to have a much larger lower surface than that provided by the mount illustrated in FIG. 5.

Referring to FIG. 10, there is shown an assembly 90 for suspending plural relatively heavy articles from a mount 95 coupled to base 91 which is secured as before to ceiling 11 with screws 12. As before, the mount 95 includes a socket 96 having a bore 97 in which a rod 15 is inserted to couple and decouple the mount 95 to the base 91. The base is preferably provided with a floor 92 and a downwardly extending peripheral wall 93. Plural magnets 94 are secured to the lower surface of floor 92 with appropriate fastening means, preferably countersunk screws (not shown), the lower planar surfaces of the magnets extending to about the horizontal plane in which the periphery of wall 93 lies.

Mount 95 is a planar member having a planar floor 98 oppositely disposed from the surfaces of magnets 94. A single large steel plate 99, but preferably plural steel plates 99 are secured to the floor 98 and located directly opposite from and in registry with magnets 94 when the mount 95 is coupled to base 91. For increased force to be exerted by the magnets, a central elongated magnet may be used with one or more ring-magnets surrounding the central magnet; correspondingly, an elongated steel plate and one or more annular rings of steel are positioned to be in registry with the magnets when the mount and base are coupled.

Figure 11:
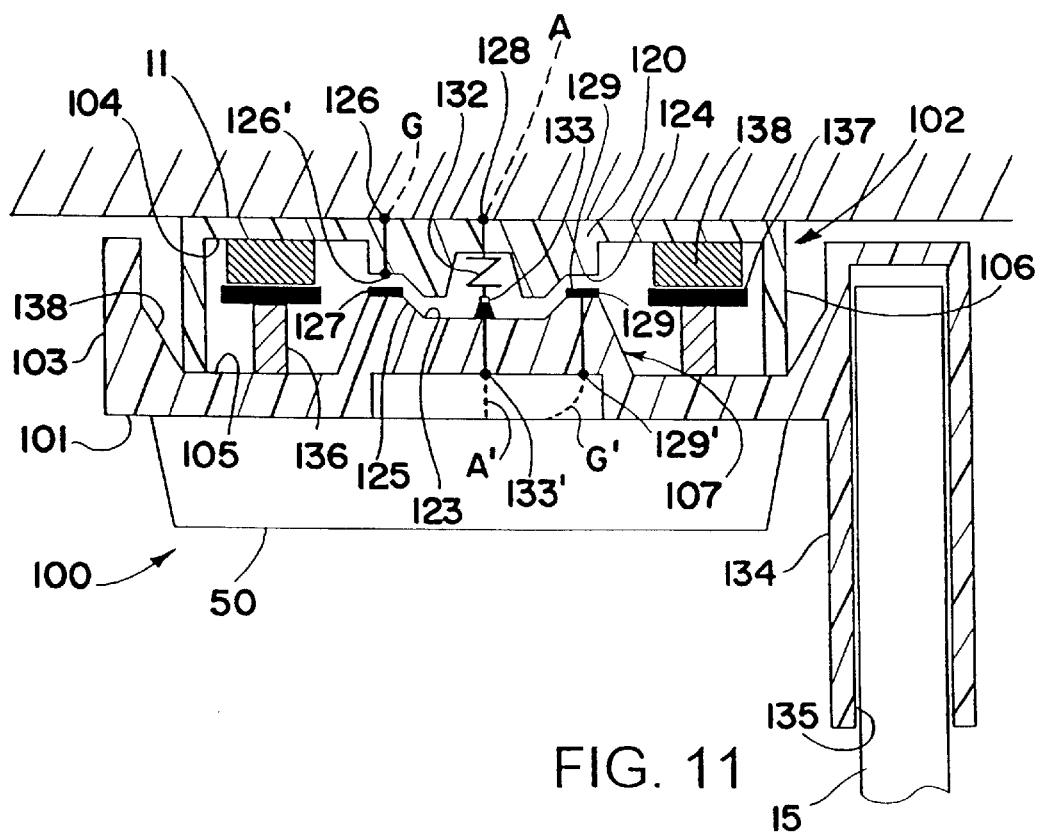
FIG. 11 is a side elevation cross-sectional view of a coupling, including a base "hard wired" to a pair of electrical leads in a ceiling, and electrically connected through the mount to two terminals of a smoke alarm.

Referring to FIG. 11, there is illustrated an assembly 100 comprising a suspended subassembly shown as a dish-shaped mount 101 coupled with a secured subassembly shown as a dish-shaped base 102 secured to ceiling 11. The base has a planar floor 104 and a downwardly extending wall 106 extending peripherally from the floor 104. The lower surface of floor 104 is provided with a downwardly projecting central boss 120 which has a recessed central portion 122 and a circumferential step 124. Electrical leads A and G in the ceiling are connected to terminals 128 and 126 respectively on the upper surface of the floor 104. Terminal 128 is centrally located and in electrical connection through recessed central portion 122, and with a conductive spring 132. Terminal 126, laterally spaced apart from terminal 128 is in electrical connection with terminal 126' on the circumferential step 124 of boss 120.

The mount 101 has upstanding walls 103 extending from the periphery of a floor 105 provided with a an upwardly projecting central boss 107 which has a recessed central portion 123 defined by a circumferential wall 125 to the upper peripheral surface 127 of which is secured an annular conductive strip 129. Centrally located within recessed central portion 123 in the upper surface of the floor 105 of mount 101 is a terminal 133 which is in electrical connection with terminal 133'. Terminal 133' is centrally located within recessed central portion 131 in the lower surface of the floor 105.

When mount 101 is coupled to base 102, terminal 126' is in contact with annular conductive strip 129 which is in electrical connection with terminal 129' in recessed central portion 131 in the lower surface of the floor 105; and spring terminal 132 is in contact with terminal 133 which is in electrical connection with terminal 133' in recessed central portion 131. When coupled spring terminal 132 is in contact with terminal 133 and terminal 126' is in contact with annular conductive strip 129. Electrical leads G' and A' extend from terminals 129' and 133' respectively for connection with appropriate terminals of a smoke alarm 50 mounted to the lower surface of floor 105.

Mount 101 includes a socket 134 having a bore 135, the socket peripherally molded with floor 105. The floor 105 has an upstanding annular wall 136 surrounding the central boss 107, and an annular steel ring 137 is secured to the peripheral surface of annular wall 136.

On the inner surface of floor 104 of base 102 is secured a ring magnet 138, positioned so as to be registrable with the annular steel ring 137 when the mount is coupled to the base. To facilitate coupling the mount to he base, the inner surface of the peripheral wall 103 is tapered at 138 so as to guide the peripheral upper surface of wall 106 until it is in close proximity to the upper surface of floor 105, the annular steel ring 137 is in contact with the ring magnet 138, and the terminals of the smoke alarm are in electrical contact with the leads A and G in the ceiling. As is well known, though a smoke alarm may be "hard wired" to the ceiling, the smoke alarm is provided with a battery which is to operate the device should there be a power failure substantially simultaneously with a fire; the battery in such a smoke alarm must be replaced when the charge runs below a safe level, and removing and replacing the battery is made easy with the assembly 100.

Figure 12:
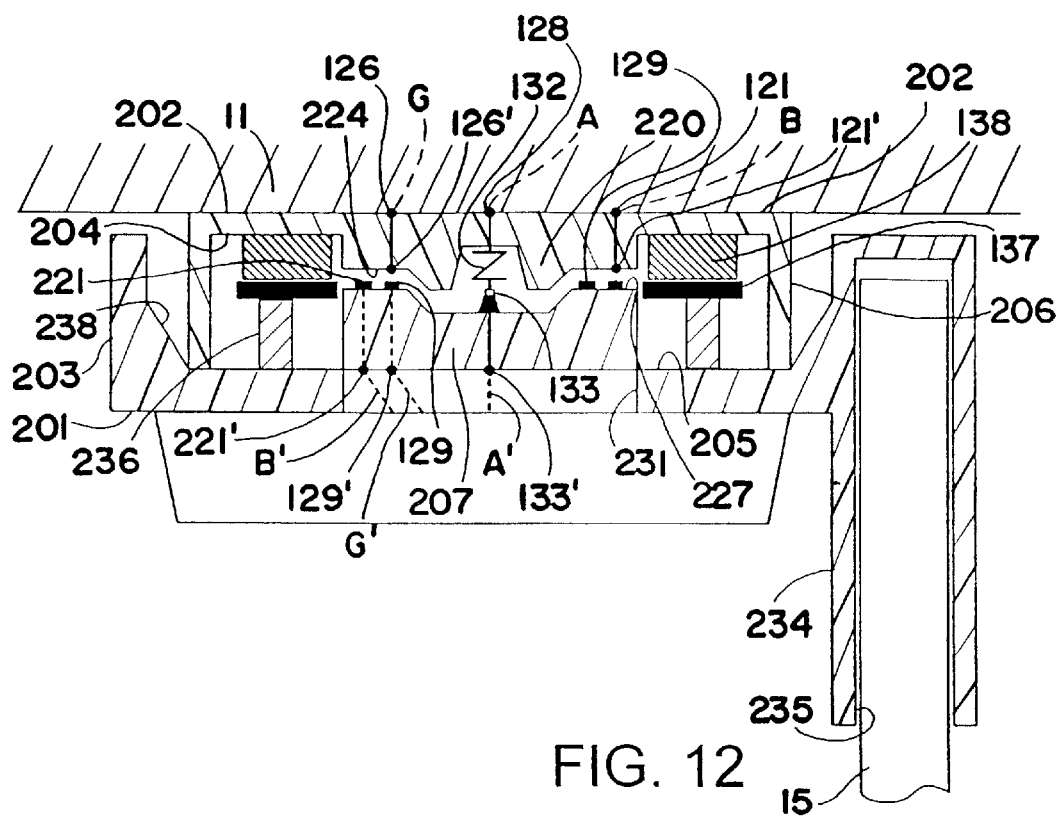
FIG. 12 is a side elevation cross-sectional view of another coupling, including a base "hard wired" to three electrical leads in a ceiling, and electrically connected through the mount to three terminals of a smoke alarm.

Referring to FIG. 12 there is illustrated an assembly 200 analogous to assembly 100 in FIG. 11 except, that provision is made to wire a smoke alarm having three terminals A, B and G. Assembly 200 comprises a suspended subassembly, shown as a dish-shaped mount 201 coupled with a secured subassembly shown as a dish-shaped base 202 secured to ceiling 11. The base has a planar floor 204 and a downwardly extending wall 206 extending peripherally from the floor 204. The lower surface of floor 204 is provided with a downwardly projecting central boss 220 which has a recessed central portion 222 and a circumferential step 224. Electrical leads A, B and G in the ceiling are connected to terminals 128, 121 and 126 respectively on the upper surface of the floor 204. Terminal 128 is centrally located in recessed central portion 222 and in electrical connection with a conductive spring 132. Terminals 121 and 126 are laterally spaced apart from terminal 128 and from each other, and are in electrical connection with terminal 121' and 126' respectively on the circumferential step 224 of boss 220.

The mount 201 has upstanding walls 203 extending from the periphery of a floor 205 provided with a an upwardly projecting central boss 207 which has a recessed central portion 223 defined by a circumferential wall 225 to the upper peripheral surface 227 of which is secured annular conductive strips 221 and 129 directly opposite terminals 121' and 126' respectively. Centrally located within recessed central portion 223 in the boss 207 on the upper surface of the floor 205 of mount 201 is a terminal 133 which is in electrical connection with terminal 133'. Terminal 133' is centrally located within recessed central portion 231 in the lower surface of the floor 205.

When mount 201 is coupled to base 202, terminal 126' is in contact with annular conductive strip 129 which is in electrical connection with terminal 129' in recessed central portion 232 in the lower surface of the floor 205; and spring terminal 132 is in contact with terminal 133 which is in electrical connection with terminal 133' in recessed central portion 231. Electrical leads G', A' and B' extend from terminals 129', 133' and 221' respectively for connection with appropriate terminals of a smoke alarm 50 mounted to the lower surface of floor 205.

Mount 201 includes a socket 234 having a bore 235, the socket peripherally molded with floor 205. The floor 205 has an upstanding annular wall 236 surrounding the central boss 207, and an annular steel ring 137 is secured to the peripheral surface of annular wall 236.

On the inner surface of floor 204 of base 202 is secured a ring magnet 138, positioned so as to be registrable with the annular steel ring 137 when the mount is coupled to the base. To facilitate coupling the mount to he base, the inner surface of the peripheral wall 203 is tapered at 238 so that when the peripheral upper surface of wall 206 is in close proximity to the upper surface of floor 205, the annular steel ring 137 is in contact with the ring magnet 138 and the terminals of the smoke alarm are in electrical contact with the leads A, B and G in the ceiling.

Figure 13:
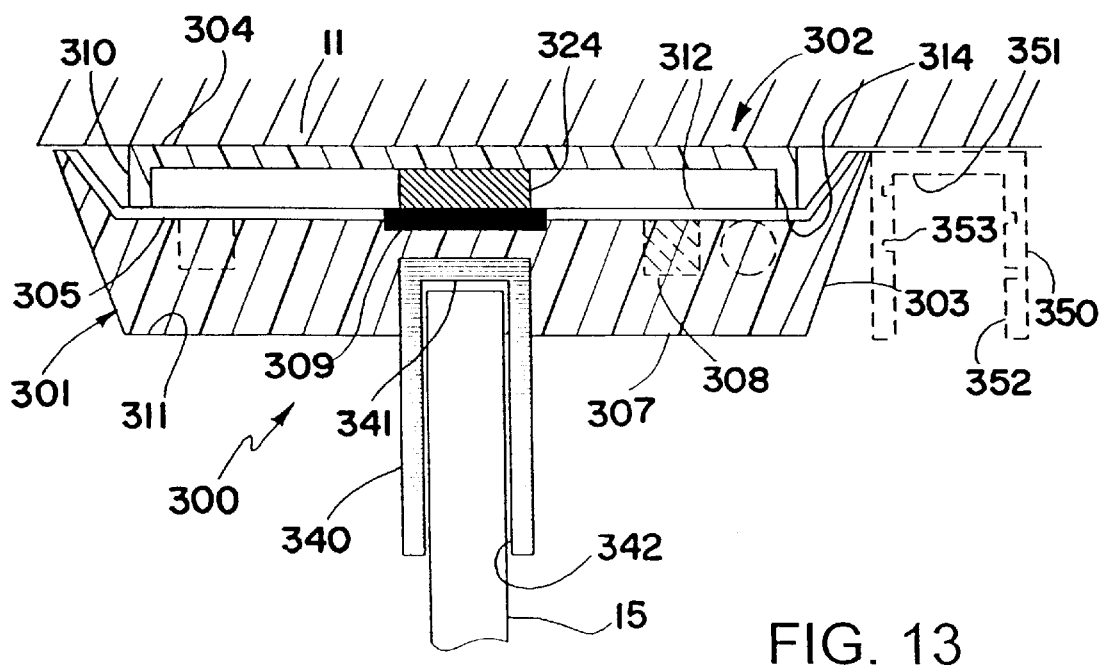
FIG. 13 is a side elevation cross-sectional view of a coupling, including a base to which is magnetically coupled the base of a smoke alarm; a socket or other rod-attachment means is provided in the center of the cover of the smoke alarm; optionally, the socket is secured peripherally and may be internally threaded as shown in phantom outline.

Referring to FIG. 13, there is schematically illustrated an assembly indicated generally by reference numeral 300, comprising a secured subassembly 302 and a suspended subassembly 301, by itself, which is the article to be suspended. The secured subassembly 302 includes a base 304 and a magnet 324 secured therewithin with fastening means (not shown) to ceiling 11 in a manner analogous to that illustrated and described in FIG. 1. Illustrated in FIG. 13 is a smoke alarm 303 having a cover 307 removably secured to a component-mounting floor 305, for mounting electrical components. The component-mounting floor 305 is analogous to, and may be substituted for, the planar floor 98 of the planar member 95 in FIG. 10. The smoke alarm has no other base, as is common for smoke alarms in which the component-mounting floor is removably mounted to a base, typically with a bayonet mount. Among the components is a battery 308 which is to be periodically replaced. The floor 305 is recessed in the center to have a steel plate 309 fixedly held therein.

The cover 307 is provided with a socket 340, preferably near the center of the cover and integrally molded therewith, the socket having a bottom 341 inwardly spaced from the cover's lower surface 311 for a distance sufficient to provide secure purchase for the end of a rod 15 which is slidably snugly inserted in bore 342 when the smoke alarm 303 is to be removed from, or replaced onto the base 304. If desired, the bore 342 may be internally threaded with threads 353 to receive the end of a complementarily threaded rod (not shown). Less preferably, the cover may be provided with a through-aperture defined by the diameter of the bore 342, into which through-aperture the rod 15 may be inserted and stopped by steel plate 309. To remove the smoke alarm 303 however, a force exerted on the rod 15 to angulate it and dislodge the steel plate 309 from contact with magnet 324 causes pressure to be exerted on the periphery of the through-aperture. Since the cover 307 is typically made of relatively fragile plastic, a through-aperture is less preferred to socket 340.

In view of the relatively fragile nature of a typical cover 307, an alternative to providing a socket 340 within the cover, is to provide a socket 350, shown in phantom outline, at the periphery of component-mounting floor 305, the socket 350 molded integrally with floor 305. The socket 350 has a bottom 351 extending laterally from the mounting floor 305, and the socket's bore 352 is adapted to receive the end of rod 15. If desired, the bore 352 may be internally threaded with threads 353 to receive the end of a complementarily threaded rod (not shown).

Whether the socket is provided within the cover 307 or secured to the mounting floor 305, it serves to transmit the force exerted by the end of rod 15 to dislodge the smoke alarm 303 from base 304. After the smoke alarm is lowered, the cover 307 is manually removed from the component-mounting floor 305 and the battery 308 removed and replaced.

Though base 304 may be a plate, it is preferred to have it include a peripheral wall 310, the peripheral lower surface 314 of which extends downward to near, or in contact with the inner surface 312 of the mounting floor 305. The "inner surface" refers to the surface of the floor 305 which is on the other side from that on which the components are mounted. The peripheral surface 314 serves to stabilize the ferrous metal plate 309 and register it accurately against the magnet 324. Moreover, when the rod 15 is angulated, the surface 314 provides a fulcrum to facilitate the steel plate 309 breaking contact with the magnet 324.

Figure 14:
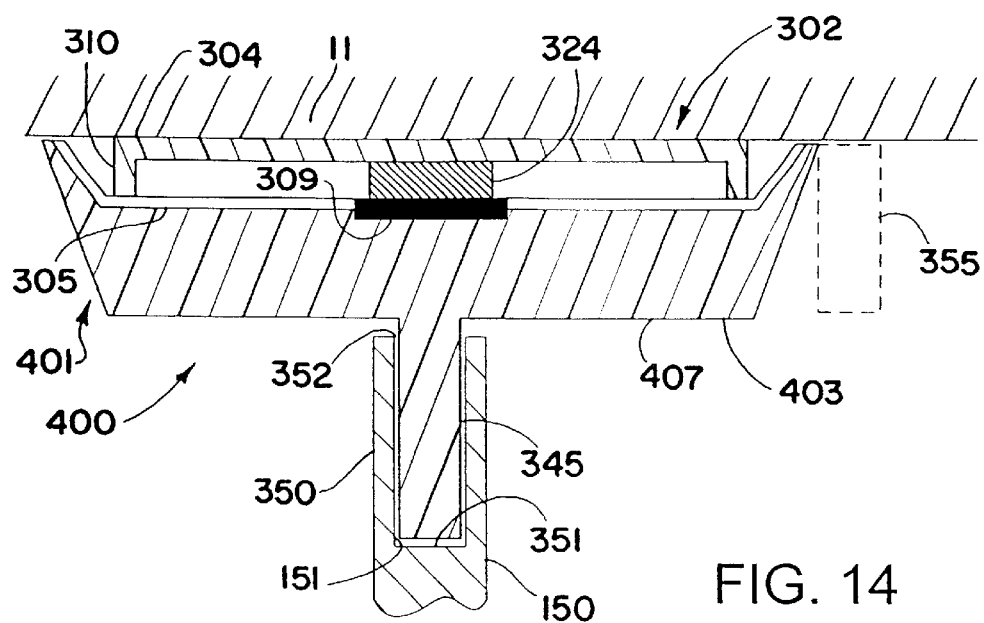
FIG. 14 is a side elevation cross-sectional view of a coupling, including a base to which is magnetically coupled the base of a smoke alarm; a finger-like protrusion is secured to the center of the cover; optionally, the finger-like protrusion is secured peripherally, as shown in phantom outline.

Referring to FIG. 14 there is schematically illustrated an assembly 400 comprising secured subassembly 302 secured to ceiling 11 and suspended subassembly 401 including a smoke alarm 403, analogous to the assembly 300 in FIG. 13, except that instead of socket 340, smoke alarm 403 has a cover 407 from which projects a fingerlike protrusion 345. The location of the finger-like protrusion 345, like the location of the socket 340, is not narrowly critical, but because a person standing on the floor of a room may not visually recognize the direction in which the advantage of maximum leverage lies, the finger-like protrusion 345 is placed near the center of the cover 407. If desired, the finger-like protrusion 345 may be threaded with threads 346 to be received in the complementarily threaded bore in the end of a rod (not shown).

For the same reason given above, namely the relative fragility of cover 407, it is preferred that the protrusion 345 be replaced with a protrusion 355, shown in phantom outline, at the periphery of component-mounting floor 305, molded integrally therewith; as before, if desired, the protrusion may be threaded to be received in the complementarily threaded bore in the end of a rod (not shown).

Figure 15:
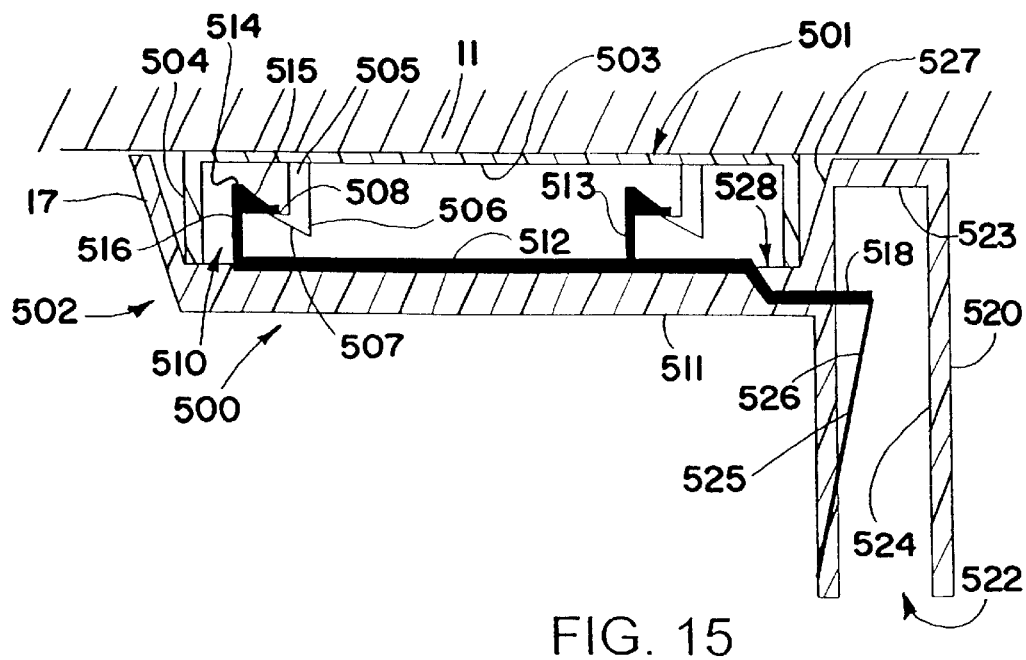
FIG. 15 is a side elevation cross-sectional schematic illustration of a coupling, including a base and mount coupled with a releasable latch means.

The detent means illustrated in FIG. 9 and the magnet and steel plate combination illustrated in the other Figures may be replaced with a latching means 510 in an assembly 500 illustrated in FIG. 15. The assembly 500 comprises a secured subassembly or base member 501 and a suspended subassembly or mount 502; the latter is latched to the base member 501 which has a planar floor 503 secured to ceiling 11, and a peripheral wall 504. Pending from the floor 503 are laterally spaced apart catches 505, preferably integrally molded with the floor 503, each catch terminating in a V-shaped portion 506. The V-shaped portion 506 has a generally triangular cross section having an inclined surface 507 and a substantially lateral surface 508.

Mount 502 has a generally planar member 511 adapted to receive a latching arm 512 which is translatable to and fro relative to catches 505, so as to engage and disengage them. Latching arm 512 includes upstanding latches 513, the bases of which are fixed to latching arm 512; each of latches 513 terminates in a V-shaped portion 514 having a generally triangular cross section, inclined so as to provide a downwardly extending stub 515 with a substantially lateral surface 516 which rests upon lateral surface 508 when engaged.

One end 518 of latching arm 512 projects through the periphery of base 511 into the bore 522 of socket 520 which is preferably integrally molded with planar member 511, the bottom 523 of the socket extending from the periphery of planar member 511. The end 518 of the latching arm 512 is attached to one end of a spring-biased lever arm 525 biased away from wall 524 of socket 520 by a spring 526. The lever arm 525 is located so that the end of a rod 15 (not shown) slidably inserted in bore 522 will compress spring 526 and urge latching arm 512 away from the longitudinal center-line of the rod. The "throw" of the latches 513 is sufficient to disengage stubs 515 from the catches 508 thus releasing mount 502 from the base member 501.

To facilitate replacing mount 502 which is supported on the end of a rod, on the base member 501, the planar member 511 is provided with an outwardly inclined wall 517 remote from and oppositely located from socket 520. Further the outer surface of wall 524, near the bottom 523 of the socket 520, is provided with an outwardly inclined surface 527 to guide the lower peripheral surface of wall 504 into contact with inner surface 528 of planar member 511, as the mount 502 is urged upwards along mating inclined surfaces 507 of each catch and those of stubs 515. As the rod is then withdrawn, pressure against the lever arm 525 is released and the spring 526 causes the stubs 515 to engage the to engage the V-shaped terminal portions 506 of the catches.

If desired, to replace the mount 502 on the base member 501, the lower end of socket 520 may be inserted in a socket at the end of a rod so that spring 526 is not compressed. When the mount 502 is then urged up against the base member 501, the spring 526 is compressed as the inclined surfaces of the stubs 515 are urged along the correspondingly inclined surfaces 507 of the V-shaped terminal portions 506 of the catches until the ends of the stubs clear the portions 506; the spring 526 is then released and secures the stubs in position on the lateral surfaces 508 of the catches.

Figure 16:
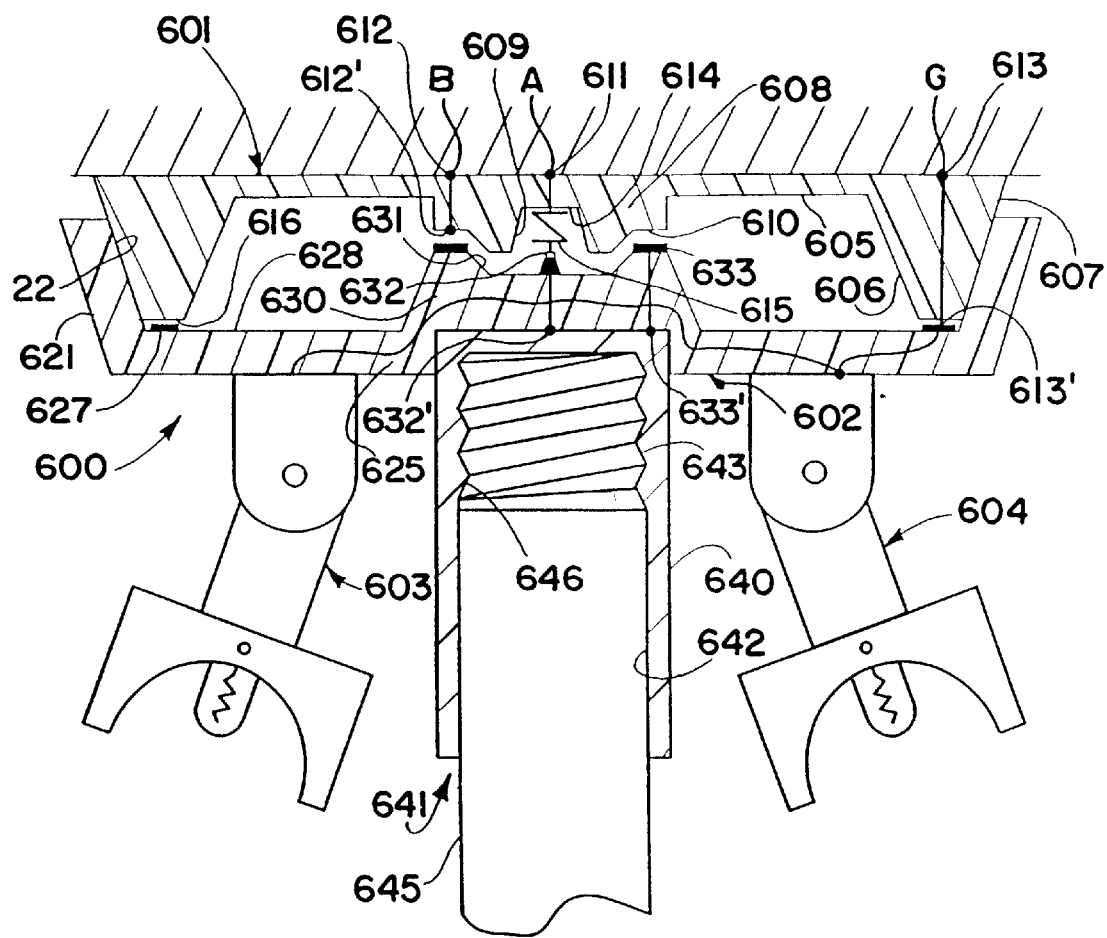
FIG. 16 is a side elevation cross-sectional view diagrammatically illustrating a coupling, including a base to which is interference-fitted a mount carrying a pair of lighting fixtures; an internally threaded socket is provided in the center of the mount. The component-mounting floor is substituted for the planar member of the mount in FIG. 10.

Referring to FIG. 16 there is schematically illustrated an assembly 600 comprising a secured subassembly or base member 601 secured to ceiling 11, and a suspended subassembly or mount 602 from which a pair of lighting fixtures 603 and 604 is suspended, the lights requiring electrical current to bulbs in the fixtures, and the two subassemblies being adapted to be coupled by an interference fit therebetween, and decoupled when desired.

As illustrated base member 601 includes a disc-shaped member 605 having a peripheral wall 606, the outer surface 607 of which is inwardly inclined. The lower surface of disc-shaped member 605 is provided with a downwardly projecting central boss 608 which has a recessed central portion 609 and a circumferential step 610. Electrical leads A (hot), B (neutral) and G (ground) in the ceiling are connected to terminals 611, 612 and 613 respectively on the upper surface of disc-shaped member 601. Three leads are shown though only first and second current-carrying leads may be necessary. Terminal 611 (first terminal) is centrally located and in electrical connection with a conductive spring 615 in recessed central portion 614. Terminal 612 (second terminal), laterally spaced apart from terminal 611, is in electrical connection with terminal 612' on the circumferential step 610 of boss 608. Terminal 613, laterally spaced apart from both terminals 611 and 612, is in electrical connection with terminal 613' on the peripheral lower surface 616 of wall 606.

The mount 602 includes a mounting member 625 which has a generally planar floor 628 and an upstanding peripheral wall 621; the wall 621 is outwardly directed and inclined from the vertical center-line of mounting member 625 to which fixtures 603 and 604 are mounted; and the inner surface 622 of wall 621 is complementarily inclined to be tightly fitted over outer surface 607 of wall 606 until the peripheral surface 616 is biased against a conductive ring 627 secured near the periphery of the inner surface 628 of cover 625. The conductive ring 627, in turn, is in electrical connection with leads to the bases of lighting fixture 603 and 604.

The upper (or inner) surface of planar floor 628 has a central boss 630 projecting upward and having a central recess 631 within which is centrally located a terminal 632 (third terminal) adapted to contact central terminal 615 (first terminal) when the subassemblies are coupled. The upper peripheral surface of the circumferential shoulder of the boss 630 has a conductive ring 633 (fourth terminal) fixedly secured therein so as to be in contact with terminal 612' (and in electrical connection with second terminal 612) when the subassemblies are coupled. Thus terminals 632 and 633 are in electrical connection with appropriate hot and neutral leads 632' and 633' respectively which are in turn connected to the appropriate leads for the lighting fixtures.

Also centrally located in mount 602, preferably axially aligned with central boss 630, is a socket 640 having a bore 641. The walls 642 of the socket 640 are internally threaded with threads 643 so as to threadedly receive threaded end 646 of rod 645.

It will now be evident that the method of releasably coupling first and second subassemblies of an assembly to be mounted on a ceiling, comprises, securing one of the subassemblies, the first or secured subassembly, to the ceiling, the secured subassembly including a first portion of a coupling means; supporting the other of the subassemblies, the second or suspended subassembly, on the end of an elongated rod, the suspended subassembly including a second portion of the coupling means and a rod-acceptance means; registering the suspended subassembly to the secured subassembly to engage the coupling means; and, removing the rod.

To decouple the suspended subassembly from the secured subassembly, the method comprises, attaching one end of a rod a the rod-attachment means secured to the suspended subassembly; exerting a force on the rod sufficient to decouple the suspended subassembly from the secured subassembly; supporting the decoupled suspended subassembly on the end of the rod, and lowering the suspended subassembly.

The method of releasably magnetically coupling subassemblies of a an assembly comprising a base member and a mount comprises, first securing the base member to a ceiling of a room so as to provide a secured subassembly; interposing a magnet and a ferrous plate between the base member and the mount while supporting the mount on the end of a rod, the mount including either the magnet or the ferrous plate, and a rod-attachment means; registering the ferrous plate to the magnet to engage them; and, removing the rod.

More specifically, the method comprises, securing a dish-shaped base to the ceiling, the base including a first portion of a magnet coupling means fixedly attached therein; supporting a dish-shaped mount on the end of a rod, the second subassembly including a second portion of the coupling means and a rod-attachment means; releasably magnetically coupling the mount to the base; and, removing the rod.

More preferably, the mount is cup-shaped and has a rigid floor from which an article is to be suspended from the ceiling; and the base is also dish-shaped having a planar floor to be secured to the ceiling, and walls directed vertically downward so as to be matingly received in the mount in male-female relationship. A magnet in the base is secured to its floor, remote from the ceiling for maximum effect. The dish-shaped mount also has generally upright walls and a ferrous plate fixedly secured to its floor; and, a rod-attachment means peripherally disposed on the mount.

Most preferably, the dish-shaped base having a magnet mounted therein is secured to the ceiling; the mount is a smoke detector and alarm assembly having a base and removable cover; on one side of the base is mounted smoke-sensing and alarm-giving means; on the other side of the base is mounted a ferrous plate; and the rod-attachment means is secured to the mount, either peripherally on the base of the smoke alarm, or on the cover; and the mount is matingly coupled with the base. Thus a person standing on the floor of a room can insert the rod in the rod-attachment means, and by manually applying sufficient lateral force on the rod at a location remote from the rod-attachment means, can angularly displace the rod relative to the vertical thus decoupling the mount from the base.

Having thus provided a general discussion, described the overall combination of subassemblies in detail and illustrated the invention with specific examples of the best mode of carrying it out, it will be evident that the invention may be incorporated in numerous applications only some of which are described. The ability to attach and remove an article to the ceiling using a rod to decouple a magnetic coupling provides an effective solution to an age-old problem. It is therefore to be understood that no undue restrictions are to be imposed by reason of the specific embodiments illustrated and discussed, and particularly that the invention is not restricted to a slavish adherence to the details set forth herein.

I claim:

1. In an assembly for releasably coupling a suspended first subassembly to a secured second subassembly secured to a room's ceiling which is out of a reach of a person's outstretched arms when the person is standing on the room's floor, the improvement comprising, the suspended subassembly and the secured subassembly being registrable and removably couplable, one with the other, by the person without manually directly contacting either;

the secured second subassembly comprising,
a base fixedly secured to the ceiling or other overhead location, the base having walls directed generally downward, and,
a first portion of a coupling means included within the walls of the base; the suspended first subassembly comprising,
a mounting member having a generally planar floor;
a second portion of the coupling means included within the mounting member; and,
rod-accepting means integrally formed with the mounting member, the rod-accepting means being adapted to coact with one end of an elongated rod means,
wherein the rod-accepting means is a rod-attachment means selected from a socket and a protrusion, and the coupling means comprises inclined walls on the base and correspondingly inclined walls on the mount so that the walls are tightly interfitted with a press fit of their respective inclined surfaces overlying one with the other when the suspended subassembly is coupled with the secured subassembly.

2. The assembly of claim 1, wherein the suspended first subassembly is a smoke detector and alarm assembly.

3. The assembly of claim 1, wherein the suspended first subassembly is a light fixture.

4. In an assembly for releasably coupling a suspended first subassembly to a secured second subassembly secured to a room's ceiling which is out of a reach of a person's outstretched arms when the person is standing on the room's floor, the improvement comprising, the suspended subassembly and the secured subassembly being registrable and removably couplable, one with the other, by the person without manually directly contacting either;

the secured second subassembly comprising,
a base fixedly secured to the ceiling or other overhead location, the base having walls directed generally downward, and,
a first portion of a coupling means included within the walls of the base;

the suspended first subassembly comprising,
a mounting member having a generally planar floor;
a second portion of the coupling means included within the mounting member; and,
rod-accepting means integrally formed with the mounting member, the rod-accepting means being adapted to coact with one end of an elongated rod means,
wherein the rod-accepting means is a rod-attachment means selected from a socket and a protrusion, and the coupling means comprises a hook and eyelet means, one member of which is adhesively secured within the suspended subassembly and the other member of which is adhesively secured within the secured subassembly.

5. The assembly of claim 4 wherein the first portion of the coupling means comprises a magnet means and the second portion comprises a ferrous plate registrable with the magnet means when the suspended subassembly is coupled with the secured subassembly.

6. The assembly of claim 5 wherein the magnet means includes at least one magnet secured in a dish-shaped base having a generally planar floor secured to the ceiling, and the ferrous plate is a steel ring overlying the magnets when the suspended subassembly is coupled to the secured subassembly.

7. The assembly of claim 6 wherein the magnet means includes plural magnets secured in spaced-apart relationship in the dish-shaped base.

8. The assembly of claim 6 wherein the planar floor of the suspended subassembly is provided with fastening means adapted to pendently secure an article from the ceiling.

9. The assembly of claim 6 wherein a smoke detector and alarm assembly is pendently mounted from the planar floor of the suspended subassembly.

10. The assembly of claim 6 wherein the secured subassembly comprises a base having a floor with a downwardly extending peripheral wall, and plural magnets secured to the floor's lower surface with fastening means; and the suspended subassembly comprises a planar member having a planar floor having at least one steel plate secured therein, located directly opposite from and in registry with the magnets 94 the suspended subassembly is coupled to secured subassembly.

11. The assembly of claim 4 wherein the first portion of the coupling means comprises a magnet means and the second portion comprises a second magnet means registrable with the first magnet means when the suspended subassembly is coupled with the secured subassembly.

12. The assembly of claim 4, wherein the planar floor of the suspended subassembly includes a cup-shaped member and a suspension member attached to the lower surface of cup-shaped member, the suspension member having a much larger lower surface than that presented by the cup-shaped member and fastening means adapted to pendently secure an article from the ceiling.

13. The assembly of claim 12 wherein the suspension member includes a through-passage near the suspension member's periphery, the passage being adapted to have an end of the rod inserted therein.

14. The assembly of claim 4, wherein the suspended first subassembly is a smoke detector and alarm assembly.

15. The assembly of claim 4, wherein the suspended first subassembly is a light fixture.

16. In an assembly for releasably coupling a suspended first subassembly to a secured second subassembly secured to a room's ceiling which is out of a reach of a person's outstretched arms when the person is standing on the room's floor, the improvement comprising, the suspended subassembly and the secured subassembly being registrable and removably couplable, one with the other, by the person without manually directly contacting either;

the secured second subassembly comprising,
a base fixedly secured to the ceiling or other overhead location, the base having walls directed generally downward, and,
a first portion of a coupling means included within the walls of the base;

the suspended first subassembly comprising,
a mounting member having a generally planar floor;
a second portion of the coupling means included within the mounting member; and,
rod-accepting means integrally formed with the mounting member, the rod-accepting means being adapted to coact with one end of an elongated rod means,
wherein the rod-accepting means is a rod-attachment means selected from a socket and a protrusion, and the coupling means comprises a detent means, one member of which is integral with the suspended subassembly and the other member of which is integral with the secured subassembly, and one member of the detent means is a groove in an apex formed by an outwardly upwardly flaring peripheral wall of the suspended subassembly and the suspension member's floor, and the other member is a rim of a downwardly flaring peripheral wall of the secured subassembly.

17. The assembly of claim 16, wherein the suspended first subassembly is a smoke detector and alarm assembly.

18. The assembly of claim 16, wherein the suspended first subassembly is a light fixture.

19. In an assembly for releasably coupling a suspended first subassembly to a secured second subassembly secured to a room's ceiling which is out of a reach of a person's outstretched arms when the person is standing on the room's floor, the improvement comprising, the suspended subassembly and the secured subassembly being registrable and removably couplable, one with the other, by the person without manually directly contacting either;

the secured second subassembly comprising,
a base fixedly secured to the ceiling or other overhead location, the base having walls directed generally downward, and,
a first portion of a coupling means included within the walls of the base;

the suspended first subassembly comprising,
a mounting member having a generally planar floor;
a second portion of the coupling means included within the mounting member; and,
rod-accepting means integrally formed with the mounting member, the rod-accepting means being adapted to coact with one end of an elongated rod means,
wherein the rod-accepting means is a rod-attachment means selected from a socket and a protrusion, and the coupling means comprises a latching means one member of which is included in the suspended subassembly and the other member of which is included with the secured subassembly, and one member of the latching means comprises laterally spaced apart catches each catch terminating in a V-shaped portion having a generally triangular cross section with inclined and substantially lateral surfaces, the other member comprising a latching arm translatable to and fro relative to the catches so as to engage and disengage them, the latching arm including upstanding latches the bases of which are fixed to the latching arm, each latch terminating in a V-shaped portion having a generally triangular cross section with downwardly extending stubs having inclined and substantially lateral surfaces so as to rest upon the catches' lateral surfaces when coupled.

20. The assembly of claim 19, wherein the suspended first subassembly is a smoke detector and alarm assembly.

21. The assembly of claim 19, wherein the suspended first subassembly is a light fixture.

22. An assembly for releasably coupling a first subassembly to a second subassembly, comprising:
a suspended first subassembly and a secured second subassembly, each being registrable and removably couplable, one with the other;
the secured second subassembly comprising
a base fixedly secured to a support, and
a first portion of a coupling means;
the suspended first subassembly comprising
a mounting member having a floor,
a second portion of the coupling means, and
a rod-accepting means, the rod-accepting means being adapted to coact with one end of an elongated rod means,
wherein the rod-accepting means is a rod-attachment means selected from a socket and a protrusion, and the coupling means comprises inclined walls on the base and correspondingly inclined walls on the mount so that the walls are tightly interfitted with a press fit of their respective inclined surfaces overlying one with the other when the suspended subassembly is coupled with the secured subassembly.

23. An assembly for releasably coupling a first subassembly to a second subassembly, comprising:
a suspended first subassembly and a secured second subassembly, each being registrable and removably couplable, one with the other;
the secured second subassembly comprising
a base fixedly secured to a support, and
a first portion of a coupling means;
the suspended first subassembly comprising
a mounting member having a floor,
a second portion of the coupling means, and
a rod-accepting means, the rod-accepting means being adapted to coact with one end of an elongated rod means,
wherein the rod-accepting means is a rod-attachment means selected from a socket and a protrusion, and the coupling means comprises a hook and eyelet means, one member of which is secured to the suspended subassembly and the other member of which is secured to the secured subassembly.

24. An assembly for releasably coupling a first subassembly to a second subassembly, comprising:
a suspended first subassembly and a secured second subassembly, each being registrable and removably couplable, one with the other;
the secured second subassembly comprising
a base fixedly secured to a support, and
a first portion of a coupling means;
the suspended first subassembly comprising
a mounting member having a floor,
a second portion of the coupling means, and
a rod-accepting means, the rod-accepting means being adapted to coact with one end of an elongated rod means,
wherein the rod-accepting means is a rod-attachment means selected from a socket and a protrusion, and the coupling means comprises a detent means, one member of which is integral with the suspended subassembly and the other member of which is integral with the secured subassembly, and one member of the detent means is a groove in an apex formed by an outwardly upwardly flaring peripheral wall of the suspended subassembly and the suspension member's floor, and the other member is a rim of a downwardly flaring peripheral wall of the secured subassembly.

25. An assembly for releasably coupling a first subassembly to a second subassembly, comprising:
a suspended first subassembly and a secured second subassembly, each being registrable and removably couplable, one with the other;
the secured second subassembly comprising
a base fixedly secured to a support, and
a first portion of a coupling means;
the suspended first subassembly comprising
a mounting member having a floor,
a second portion of the coupling means, and
a rod-accepting means, the rod-accepting means being adapted to coact with one end of an elongated rod means,
wherein the rod-accepting means is a rod-attachment means selected from a socket and a protrusion, and the coupling means comprises a latching means one member of which is included in the suspended subassembly and the other member of which is included with the secured subassembly, and one member of the latching means comprises laterally spaced apart catches, the other member comprising a latching arm translatable to and fro relative to the catches so as to engage and disengage them.

* * * * *